United States Patent
Alcarria Grande et al.

(10) Patent No.: US 12,057,653 B2
(45) Date of Patent: Aug. 6, 2024

(54) ELECTRICAL CONNECTION UNIT

(71) Applicant: THERMO KING LLC, Minneapolis, MN (US)

(72) Inventors: Manuel Angel Alcarria Grande, Barcelona (ES); Ryan Wayne Schumacher, Bloomington, MN (US); Esteban Canade Tarquini, Barcelona (ES); Alessandro Silvestri, Barcelona (ES)

(73) Assignee: THERMO KING LLC, Minneapolis, MN (US)

( * ) Notice: Subject to any disclaimer, the term of this patent is extended or adjusted under 35 U.S.C. 154(b) by 163 days.

(21) Appl. No.: 17/721,032

(22) Filed: Apr. 14, 2022

(65) Prior Publication Data
US 2022/0336993 A1 Oct. 20, 2022

(30) Foreign Application Priority Data
Apr. 16, 2021 (EP) .................................. 21382326

(51) Int. Cl.
*H01R 13/44* (2006.01)
*H01R 13/453* (2006.01)
*H01R 13/50* (2006.01)

(52) U.S. Cl.
CPC ......... *H01R 13/4532* (2013.01); *H01R 13/50* (2013.01)

(58) Field of Classification Search
CPC .. H01R 13/4532; H01R 13/50; H01R 13/453; H01R 13/447; H01R 13/4536; H01R 13/501; H01R 13/44
See application file for complete search history.

(56) References Cited

U.S. PATENT DOCUMENTS 3,141,713 A * 7/1964 Kauffman ........... A47L 15/4259
439/142
3,660,798 A * 5/1972 Marzec ................ H01R 13/707
174/67

(Continued)

FOREIGN PATENT DOCUMENTS

| DE | 614730 | 6/1935 |
| DE | 102010001411 | 8/2011 |
| DE | 102013201674 | 8/2014 |

OTHER PUBLICATIONS

Extended European Search Report, issued in the corresponding EP patent application No. 21382326.3, dated Oct. 11, 2021, 7 pages.

*Primary Examiner* — Harshad C Patel
(74) *Attorney, Agent, or Firm* — HSML P.C.

(57) ABSTRACT

There is disclosed an electrical connection unit for a refrigeration system comprising: a container defining an interior for containing electrical circuitry, the container having an external port configured to couple with an external connector; a closure moveable relative to the container between a closed configuration in which access to the interior is prevented, and an open configuration in which access to the interior is permitted. The closure has a locking portion defining a connector opening for receiving the connector, configured so that movement of the closure to the open configuration is prevented by interlocking engagement of the connector and the closure. There is also disclosed an associated method of coupling or decoupling a connector and an electrical connection unit.

14 Claims, 13 Drawing Sheets

(56) References Cited

U.S. PATENT DOCUMENTS

| | | | |
|---|---|---|---|
| 5,504,655 A * | 4/1996 | Underwood | H02M 7/003 |
| | | | 439/911 |
| 5,735,701 A | 4/1998 | Jarrett | |
| 5,998,735 A * | 12/1999 | Patterson, Jr. | H02G 3/14 |
| | | | 174/67 |
| 6,372,987 B1 * | 4/2002 | Ha | H02G 3/14 |
| | | | 174/67 |
| 7,258,556 B1 * | 8/2007 | Boutros | H01R 13/62933 |
| | | | 439/142 |
| 7,837,484 B2 * | 11/2010 | Wu | H01R 13/4534 |
| | | | 439/136 |
| 8,288,651 B2 * | 10/2012 | Smith | H01R 13/5205 |
| | | | 174/53 |
| 9,083,104 B2 * | 7/2015 | Kim | H01R 13/4534 |
| 9,088,087 B2 * | 7/2015 | Wardenburg | H01R 13/447 |
| 9,543,693 B2 * | 1/2017 | Koszeghy | H01R 13/6397 |
| 2004/0092744 A1 * | 5/2004 | Tomasi | A61P 27/06 |
| | | | 546/67 |

* cited by examiner

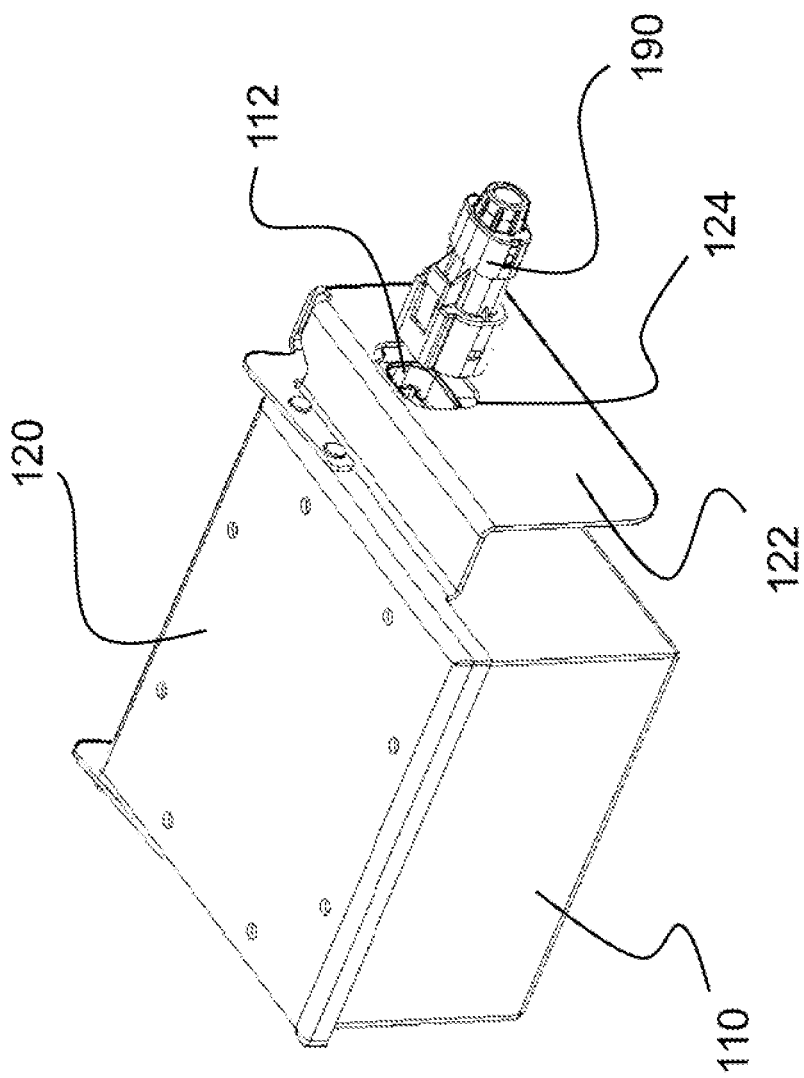

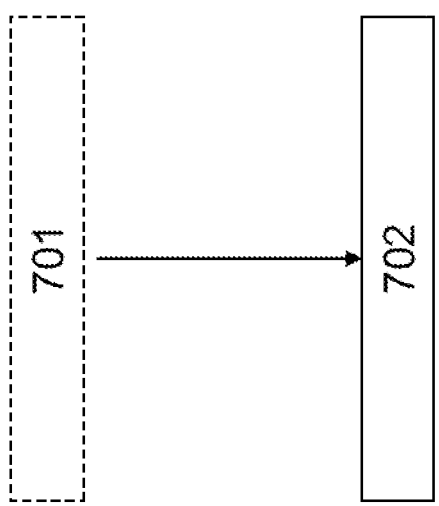

ELECTRICAL CONNECTION UNIT

FIELD OF THE INVENTION

The invention relates to an electrical connection unit for use with an electrical power distribution system, in particular but not exclusively an electrical connection unit configured to supply electrical energy to a transport refrigeration system (TRU), the electrical connection unit comprising internal components to which access is required during installation, servicing, reconfiguration and/or maintenance.

BACKGROUND OF THE INVENTION

It is known for a transport refrigeration unit (TRU) to comprise a plurality of loads, and to receive and/or distribute power from a plurality of power sources. An electrical system of a transport refrigeration unit is an example of electrical systems which involve connections between one or more power sources and one or more loads.

Access to parts of an electrical system may be required, for example during manufacture, commissioning or installation, and servicing. For example, access may be required to reconfigure or replace components during installation and/or servicing.

It is known for electrical systems to use a hazardous voltage supply. A hazardous voltage may be defined as an electrical voltage which poses a significant risk to health if a human operator (or animal) comes into proximity of or into contact with electrical circuitry through which the hazardous voltage is being conducted. The significant risk to health posed by the hazardous voltage may stem from a risk of electric shock or electrocution, and/or from an electrical arc-flash and/or an electrical arc-blast.

It is desirable to prevent a human operator (or other living thing such as an animal) from coming into proximity of or contact with a hazardous voltage or a hazardous voltage circuit during installation, servicing, reconfiguration and/or maintenance.

It is known to use a sensor and/or a switch as part of a safety system for this purpose. Such systems typically use mechanical switches or various types of electrical sensors for determining whether the interior of an electrical connection unit is being accessed by an operator. Examples of electrical sensors used for this purpose include inductive coil sensing switches and optical sensors. If the determination is positive, the safety system may disable or de-energise hazardous voltage circuitry contained within the electrical connection unit.

SUMMARY

According to a first aspect, there is provided an electrical connection unit for a refrigeration system comprising: a container defining an interior for containing electrical circuitry, the container having an external port configured to couple with an external connector; a closure moveable relative to the container between a closed configuration in which access to the interior is prevented, and an open configuration in which access to the interior is permitted, wherein the closure has a locking portion defining a connector opening for receiving the connector; wherein the container and the closure are configured so that, when the closure is in the closed configuration, the connector opening is aligned with the port to permit coupling of the connector to the port through the connector opening to interlock with the closure; whereby movement of the closure to the open configuration is prevented by interlocking engagement of the connector and the closure.

The interior of the container may be configured to contain, or may contain, hazardous electrical circuitry.

The closure may be moveable relative to the container between a closed position corresponding to the closed configuration, and one or more open positions corresponding to the open configuration. There may be a plurality of possible open positions of the closure relative to the container and in which the closure is disposed relative to the container in the open configuration.

The port may be connected or connectable to hazardous voltage circuitry when contained in the container.

It may be that the container and the closure cooperate to define a limited travel of the closure relative to the container for moving between the closed configuration and the open configuration of the closure; wherein the closure and container are configured so that the locking portion of the closure at least partly covers the port throughout the travel except for the closed configuration, to prevent a connector being coupled with the port with the closure in the open configuration.

The closure may be connected to the container by a hinge.

It may be that the locking portion is configured to overlap a side of the container when in the closed configuration; and/or wherein the locking portion depends from a lid portion of the closure in the form of a flange.

The port may be provided with a casing configured to inhibit exposure of an electrical contact therein.

It may be that the container contains a hazardous voltage interlock loop electrically connected to the port and configured to selectively energise or de-energise a hazardous voltage circuit.

It may be that the hazardous voltage interlock loop is configured to energise the hazardous voltage circuit by switching on an electrical or electronic switch such as a transistor, relay, thyristor, contactor or the like of the hazardous voltage circuit when an electrical control signal is provided thereto.

It may be that the hazardous voltage interlock loop is configured to energise or de-energise the hazardous voltage circuit by sending a signal to a hazardous voltage source to connect to or to isolate from the electrical connection unit depending on a connection status of an external connector.

It may be that the hazardous voltage interlock loop further comprises a discharge circuit configured to fully discharge stored electrical charge remaining in the hazardous voltage circuit when the hazardous voltage circuit is de-energised. The discharge circuit may be an active discharge circuit or a passive discharge circuit.

The hazardous voltage interlock loop may form part of a non-hazardous voltage circuit.

The port may be provided with a sensing arrangement configured to de-energise a hazardous voltage circuit when an external connector is not coupled to the port.

It may be that the electrical connection unit comprises two external ports, each configured to couple with an external connector, wherein for each port: there is a respective locking portion of the closure defining a connector opening for receiving the respective connector; the container and the closure are configured so that, when the closure is in the closed position, the respective connector opening is aligned with the port to permit coupling of the respective connector to the port through the connector opening to interlock with the closure; whereby movement of the closure to the open configuration is prevented by interlocking engagement of the connector and the closure. Each port and the associated locking portion may have any of the features described above with respect to the first aspect of the invention. The locking portions may be disposed on opposing sides of the container.

According to a second aspect, there is provided an assembly comprising an electrical connection unit in accordance with the first aspect and a connector configured to be coupled to the external port, or to at least one of the external ports. The electrical connection unit may have any of the features described above with respect to the first aspect. It may be that the connector and the respective connector opening have corresponding cross-sectional profiles.

According to a third aspect, there is provided a refrigeration system comprising an electrical connection unit in accordance with the first aspect, or an assembly in accordance with the second aspect.

According to a fourth aspect, there is provided a method comprising: coupling a connector to, or decoupling a connector from, the port of an electrical connection unit in accordance with the first aspect when the electrical connection unit comprises only one external port, or one of the ports of an electrical connection unit in accordance with the first aspect when the electrical connection unit comprises two external ports, when the closure is in the closed position.

BRIEF DESCRIPTION OF THE DRAWINGS

The invention will be described, by way of example only, with reference to the accompanying drawings, in which:

FIG. 1A-1C show perspective views of a first example electrical connection unit;

FIG. 7A is flow diagram of a method of coupling a connector to a port of an electrical connection unit.

DETAILED DESCRIPTION

Figure 1B:
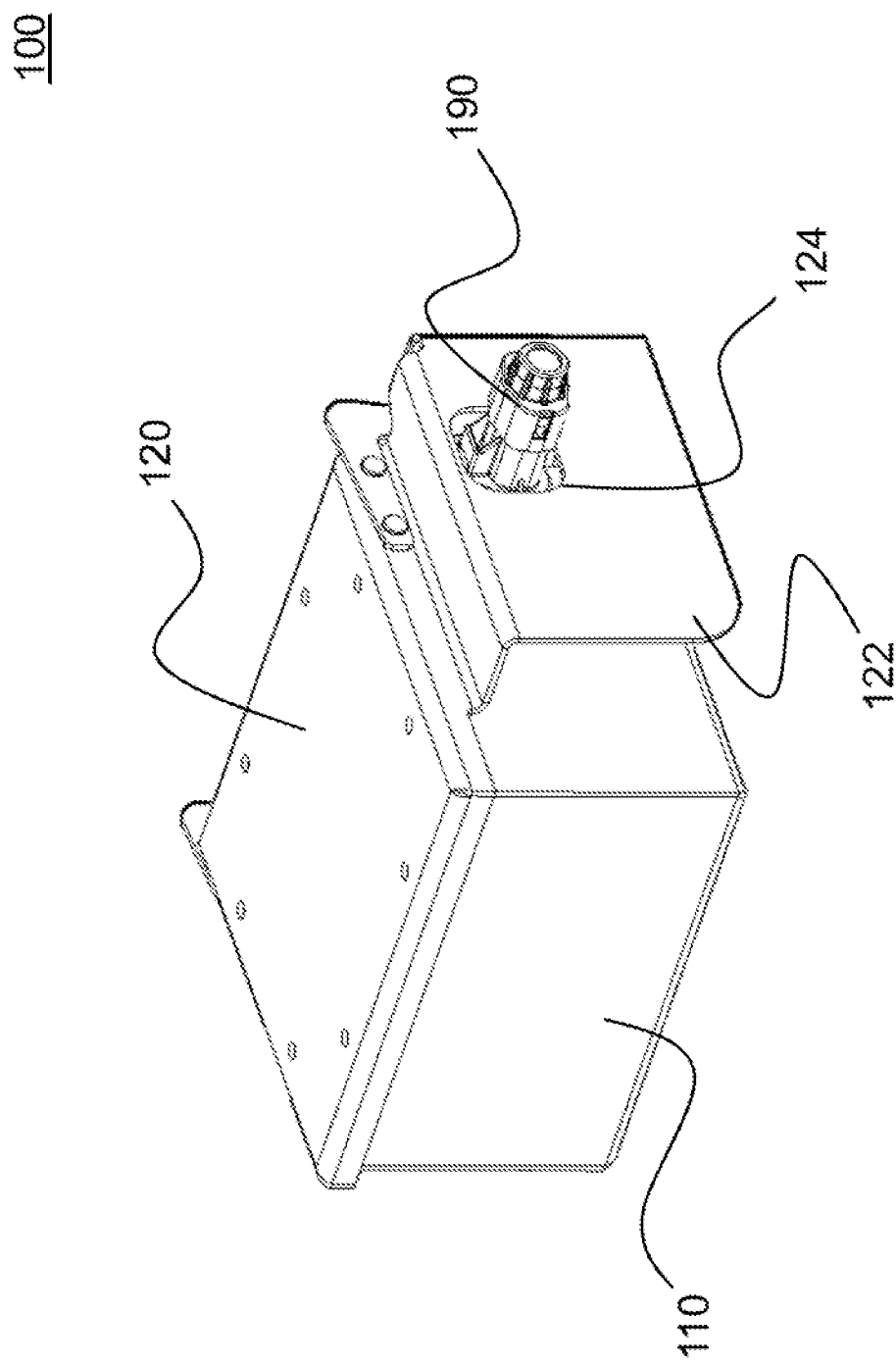
Figure 1C:
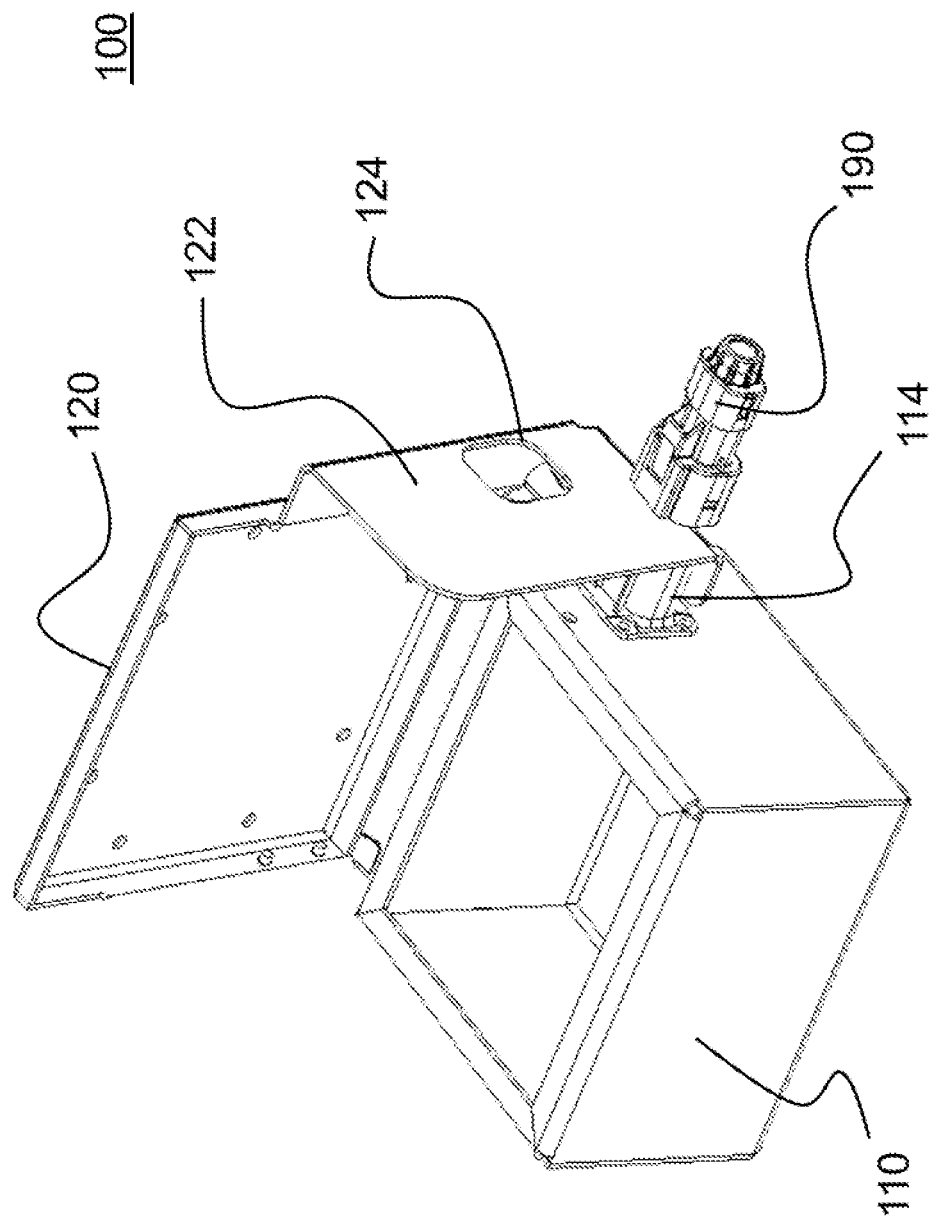

FIGS. 1A, 1B and 1C each show an electrical connection unit 100 and an external connector 190. The electrical connection unit 100 comprises a container 110 and a closure 120. In this example the container 110 is in the form of a rectangular five-sided box (which may be equally be referred to as a housing) having an open side, with the closure 120 in the form of a lid or door configured to close the open side of the container 110, but other examples may have different configurations. The container 110 defines an interior for containing electrical circuitry, such as hazardous voltage circuitry and is provided with an external port 112 configured to couple with the external connector 190. The expression "external" is used to indicate that the port 112 (and also the connector 190) is provided exteriorly of the interior of the container for connecting to the connector 190 exteriorly of the interior, as it will be appreciated that the port 112 is provided to make an interior connection with contained circuitry.

The closure 120 is moveable relative to the container 110 between a closed position in which access to the interior is prevented (i.e. a closed configuration), and a plurality of open positions in which access to the container 110 is permitted. For example, the closed configuration may be defined as the closure engaging the container to provide level 3 protection for solid foreign objects in accordance with IEC standard 60529 (EN 60529), i.e. IP3X. The open configuration may be defined as the closure being separated from the container to no longer maintain level 3 protection for solid foreign objections in accordance with IEC standard 60529, for example the closure and container in the open configuration may provide any lower rating (e.g. level 2 or level 1) or no rating (level 0) for protection against ingress of solid foreign objects in accordance with IEC standard 60529 (EN 60529). When the closure is in any of the open positions, it is in an open configuration relative to the container 110. The closure 120 is moveable relative to the container 110 throughout a travel of movement relative to the container. As will be described in detail below, the closure 120 may only be moved from the closed position to an open position when the external connector 190 is not coupled to the external port 112 of the container 110.

FIG. 1A shows a perspective view of the electrical connection unit 100 in the closed position (closed configuration) and with the external connector 190 decoupled from the external port 112. The closure has a locking portion 122 configured to interlock with the connector 190 when coupled to the port 112. In this particular example, the locking portion 122 depends from a lid portion of the closure in the form of a flange generally parallel with a side of the container, but the locking portion may take other forms in other examples, for example based on the location of a port. The locking portion 122 defines a connector opening 124 for receiving the connector 190 therethrough, for coupling and decoupling from the port 112. The container 110 and the closure 120 are configured so that, in the closed position as illustrated in FIG. 1A, the connector opening 124 is aligned with the port 112 to permit coupling of the connector 190 to the port 112 through the connector opening 124 to interlock with the closure 120. For example, the port may define a connection axis along which the connector is to be received, and the connection axis may extend through the connector opening 124 when the closure 120 is in the closed position.

FIG. 1B shows a perspective view of the electrical connection unit 100 in the closed position (closed configuration), with the external connector 190 coupled to the external port 112 of the container 110 through the connector opening 124 of the locking portion 122 of the closure 120. Movement of the closure 120 from the closed position to an open position is prevented by interlocking engagement of the connector 190 and the locking portion 122 of the closure 120. The interlocking engagement retains the closure 120 in the closed position (closed configuration) relative to the container 110.

FIG. 1C shows a perspective view of the electrical connection unit 100 in an open position (open configuration). The external connector 190 is decoupled from the external port 112 of the container 110. With the connector 190 decoupled from the port 112, the closure is free to move relative to the container 110 from the closed configuration shown in FIG. 1A and the open configuration of FIG. 1C. The closure 120 is not prevented from moving from the open position shown in FIG. 1C to another open position of the plurality of open positions, nor is it prevented from moving to the closed position.

The external port 112 is directly connected to or connectable to electrical circuitry disposed within the interior of the container 110. As will be discussed in further detail below, the electrical circuitry is in an energised state when the external connector 190 is coupled to the external port 112. When in the energised state, an electrical current flows through the electrical circuitry, which poses a risk of an electric shock to an operator if the operator comes into proximity of or into contact with the electrical circuitry in the energised state. In addition, there may be a risk of an electrical arc-flash or an electrical arc-blast occurring in the presence of an operator associated with the electrical circuitry. On the other hand, then the external connector 190 is not coupled to the external port 112, the electrical circuitry is in a de-energised state. When in the de-energised state, no electrical current flows through the electrical circuitry, and so no risk of an electric shock is posed to an operator.

The features of the electrical connection unit 100 provide a safety system which ensures that access to the interior of the container is permitted only when the external connector 190 is decoupled from the external port 112 and subsequently moved from the closed position to an open position. Accordingly, the features of the electrical connection unit 100 reduce the likelihood of an operator coming into a proximity of or into contact with the electrical circuitry in the energised state during installation, reconfiguration, servicing and/or maintenance, for example. As a result, a risk of an electrical shock to an operator is significantly reduced. In addition, the risk of an electrical arc-flash and/or an electrical arc-blast occurring in a presence of an operator is significantly reduced.

The interlocking engagement of the external connector 190 and the locking portion 122 of the closure 120 provide a reliable safety system based on a mechanical interlock, which is not prone to many of the possible failure modes of other previously-considered safety systems.

One possible failure mode associated with previously considered safety systems is a delivery of a false negative result. For example, use of a sensor such as a proximity sensor or a light sensor to determine whether a closure of a container is in an open position and therefore cause a de-energisation of electrical circuitry is liable to produce a signal indicating that the closure is in the closed position when the sensor has been somehow obstructed by, for example, a remaining part of the closure, an operator's arm, an operator's hand or a tool carried by an operator while the closure is in fact in an open position.

Another possible failure mode associated with previously considered safety systems is an individual sensor failure. A sensor used as part of a safety system may develop a fault and/or be operating outside of a set of rated operating conditions in which it is able to properly operate, such as in very warm or very cold weather, for example. In another example, an individual sensor may develop a fault due to corrosion or wear over time.

A further possible failure mode associated with previously considered safety systems is a localised power failure. An active sensor used to determine whether a closure of a container is in a closed position also requires a power supply. A localised power failure to the active sensor may therefore cause a safety system comprising the active sensor to fail.

An additional possible failure mode associated with previously considered safety systems is an intermittent failure. A sensor used as part of a safety system may be triggered intermittently by vibration and or shock loads applied during a transport of the electrical connection unit. This may cause shutdown of any and all components which are powered by electrical circuitry contained within the electrical connection unit. In turn, this may lead to further technical problems. For example, if the electrical connection unit forms part of a transport refrigeration unit (TRU), the TRU may be shut down in an unsafe condition. Additionally or alternatively, a series of intermittent shutdowns may lead to a premature spoilage of a cargo carried by the TRU.

Electrical connection units according to the present disclosure may provide a relatively simple safety system which does not require a large number of components to put into effect. Such electrical connection units may also provide a safety system with a relatively straightforward manufacturing and assembly process. In addition, such electrical connection units may provide a safety system with a more intuitive operator interface (requiring simple and intuitive connector decoupling for access to the interior) which gives an operator confidence that electrical circuitry contained therein is in the de-energised state.

The closure 120 is shown as being connected to the container 110 by a hinge 130 in the examples shown in FIGS. 1A, 1B and 1C. The hinge 130 provides a connection between the container 110 and the closure 120 such that the closure 120 is pivotable relative to the container 110 between the closed position and the plurality of open positions. In this example the closure extends over the open side of the container from a hinge side (of the closure and the container) where it is pivotably coupled to the closure 120 to a lip side (of the closure and the container). In this particular example, the closure 120 is coupled to a hinge mount provided at an intermediate point along the hinge side of the closure 110, but in other examples the hinged connection may be provided elsewhere, for example at an edge of the hinge side which delimits the open side of the container. While the closure and container are coupled by a hinge in this example, it will be appreciated that the closure 120 may be connected to the container 110 by a variety of mechanisms, including a sliding connection, for example. While potentially less practical, it may be that there is no permanent connection between the closure 120 and the container 110. For example, the closure 120 may be retained on the container 110 by virtue of the interlocking engagement of a connector with the locking portion, and/or by separate clamps or fasteners that may be removably applied to retain the closure 120 in the closed configuration.

In the example shown in FIGS. 1A, 1B and 1C, the locking portion 122 is configured to overlap a side of the container 110 when in the closed position. The locking portion 122 depends from a lid portion of the closure 120 in the form or a flange which is generally parallel with a wall of the container 110 having the port 112 (the "port wall"), and laterally offset from it so that the locking portion does not engage the port 112 as it moves relative to the container. The lid portion of the closure 120 is the portion of the closure which overlies the opening of the container 110 in the closed position. Accordingly, there is a lateral gap between the port wall of the container and the locking portion, with the port 112 extending from the respective wall by less than the separation gap. This enables the port 112 to protrude from the side of the container 110 (from the "port wall") without obstructing the movement of the closure 120 relative to the container 110 through its travel.

In other examples, the locking portion may be configured differently with respect to the lid portion of the closure. Merely as one example, a port may be provided on a panel of the container adjacent to an opening of the container (i.e. with the panel and opening forming a side of the container), and the locking portion may be substantially continuous with the lid portion of the closure, adjacent to it.

Figure 2:
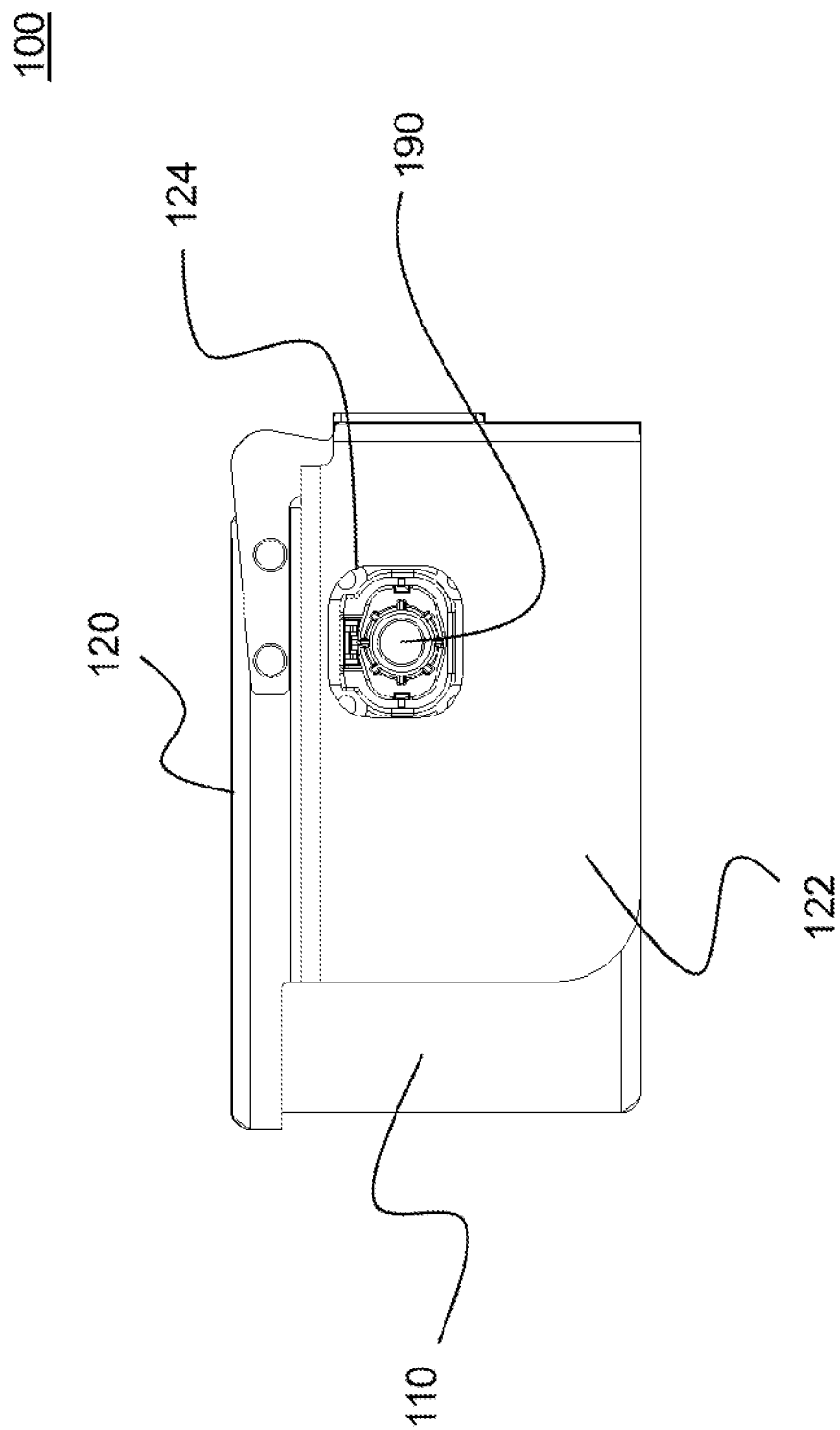
FIG. 2 shows a side view of the example electrical connection unit in a closed position.

FIG. 2 shows a side view of the electrical connection unit 100 in the closed position, with the external connector 190 coupled to the external port 112 through the connector opening 124 of the locking portion 122. In this example, the connector opening 124 and the external connector 190 have corresponding cross-sectional profiles. The corresponding cross-section profiles of the connector opening 124 and the external connector 190 may define a clearance fit therebetween when the external connector 190 is inserted through the connector opening 124 to couple with the external port 112 of the container 110.

The corresponding cross-sectional profiles of the connector opening 124 and the external connector 190 and optionally the limited clearance between them limit movement of the closure 120 when the electrical connection unit 100 is in the closed configuration. In addition to preventing access to the interior of the container, this may retain the closure in the closed configuration to provide a seal between the closure 120 and the container 110, which may protect the interior of the container from environmental conditions.

An interlock may also be formed when the cross-sectional profiles do not directly correspond. However, where there are corresponding cross-sectional profiles over at least part of the profile of the connector and connector opening, it may be that the locking portion is configured to engage (i.e. abut) sides of the connector opening over a greater area in an interlocking manner, which may reduce a contact force and wear on the connector and/or connector opening. Further, corresponding cross-sectional profiles may aid in proper alignment of the connector and port.

Figure 3:
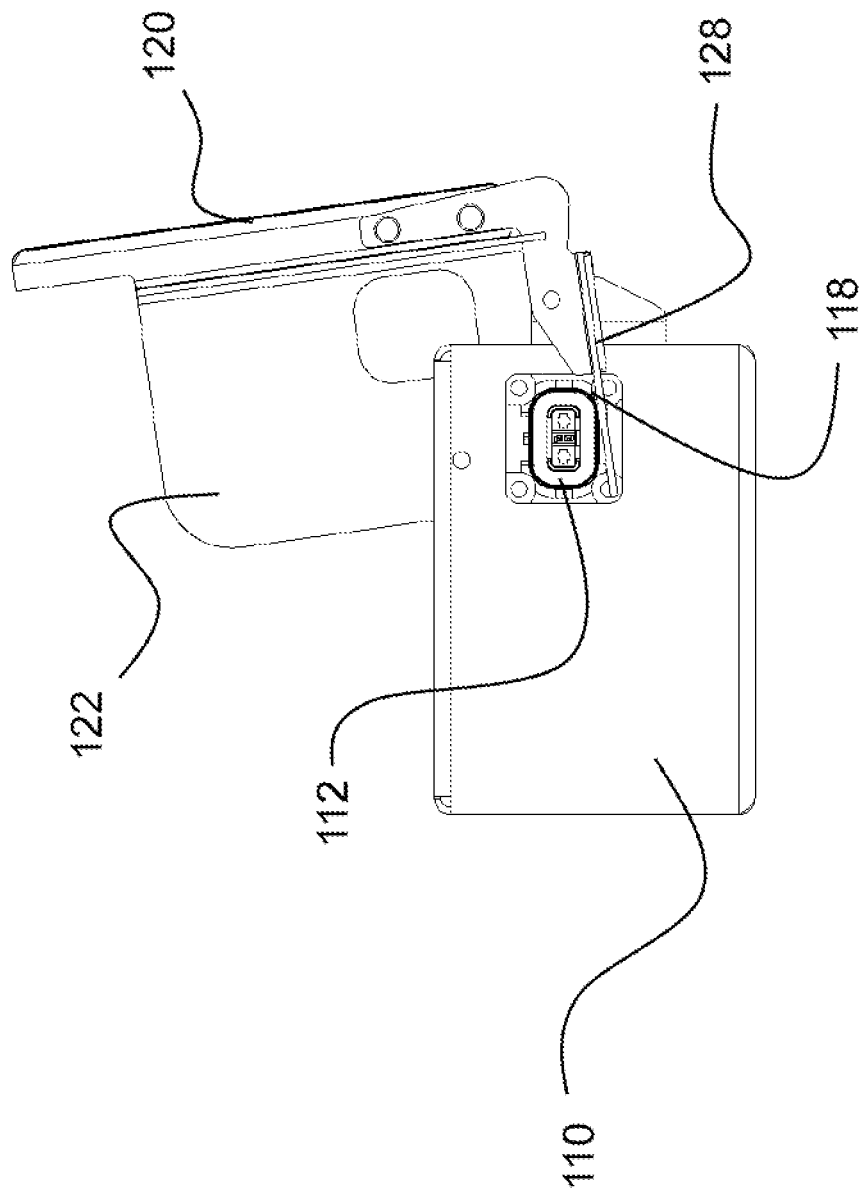
FIG. 3 shows a side view of the example electrical connection unit in an open position.

FIG. 3 shows a side view of the electrical connection unit 100 in an extreme open position or a greatest permitted open position. The expression "extreme" is used herein to denote that the respective open position is at an extreme of the travel of the closure 120 relative to the container 110, or in other words a position which bounds the travel of the closure 120 relative to the container 110. An extreme position may be defined by abutment of a portion of the closure 120 with a portion of the container which limits further travel. In this example, the closure 120 is provided with a closure stop portion 128, and the container 110 is provided with a container stop portion 118, which engage one another by abutting contact to prevent further movement of the closure aware from the closed position. In the example shown in FIG. 3, the container stop portion 118 is the external port 112, although it will be appreciated that the container stop portion 118 may take an alternative form (e.g. be provided by another portion of the container or something attached to it).

In this example, the closure stop portion 128 is provided in the form of a shoulder extending from the locking portion to at least partly span the separation gap between the port wall and the locking portion. Given the hinged connection between the closure and the container, the closure stop portion 128 is positioned relative to the locking portion so that, when the closure 120 is in the closed configuration, the stop portion 128 is at an angular position relative to the hinge that is earlier along a rotational path from the closed position through the open positions, with the closure stop portion 128 abutting the port 112 to define the extreme open position. In this example, the closure stop portion 128 is provided at an edge of the locking portion which is generally aligned with an edge of the container between the port wall and the hinge side, but it will be appreciated that other forms and locations are possible.

The respective stop portions cooperate to define a limited travel of the closure 120 relative to the container 110, corresponding to movement of the closure 120 relative to the container 110 between the closed position and through the plurality of open positions, to the extreme open position.

Figure 4:
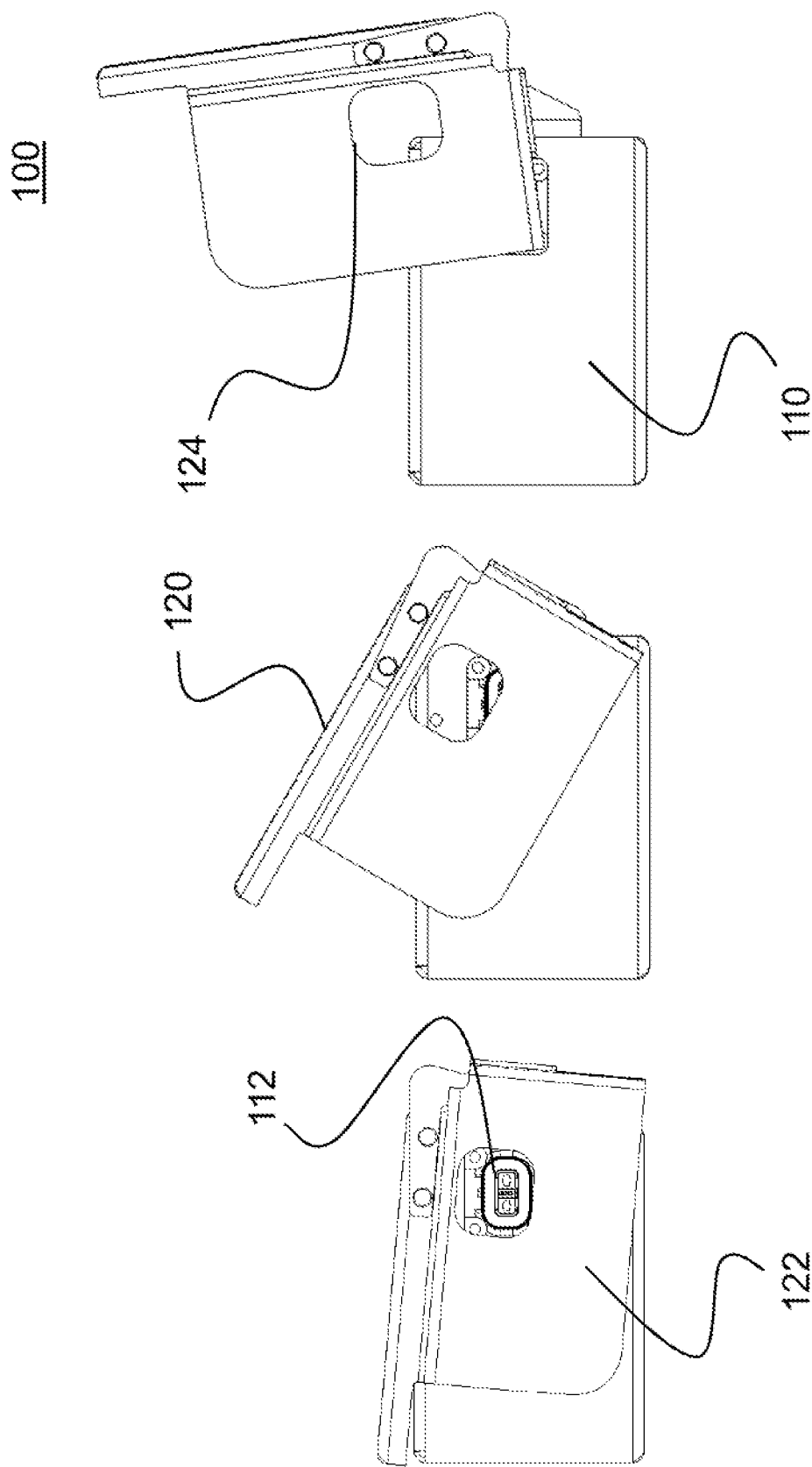
FIG. 4 shows a side view of the example electrical connection unit in a plurality of open positions.

FIG. 4 shows a side view of the electrical connection unit 100 in a plurality of open positions throughout the travel of the closure 120 relative to the container 110. At each open position, the locking portion 122 at least partially covers the port 112 such that a connector cannot be passed through the connector opening 124 to couple with the port 112. In order for a connector to be passed through the connector opening 124 to couple with the port 112, the closure 120 must be moved to the closed position. This prevents a connector from being coupled to the port 112 when the closure 120 is not in the closed position.

Access to the interior of the container is therefore prevented when the external connector 190 is coupled to the external port 112, since the container is necessarily in the closed position for the connection to be possible. As will be described in further detail below with reference to FIGS. 6A-7, access to the interior of the container 110 is only permitted when the electrical circuitry disposed therein is in the de-energised state. Further, an operator is prevented from attempting to couple the connector 190 to the port 112 when the closure 120 is in an open state, while they may be exposed to the electrical circuitry, with such an attempt otherwise representing a possible operator-induced safety hazard of the electrical connection unit.

If the external connector 190 carries a hazardous voltage and the port is connected to hazardous voltage circuitry contained within the interior of the container 110, access to the interior of the container is only permitted when the hazardous voltage carried by the external connector 190 is completely removed from the electrical connection unit 100. To contrast with a previously considered safety system using a lid sensor, such a sensor may be used to de-energise electrical circuitry contained in the container 110 when the closure 120 is in an open position, but a hazardous voltage source may remain physically present within the container 110, albeit electrically disconnected from the electrical circuitry therein. Nevertheless, in such a system there would still remain a risk that an operator may come into contact with the hazardous voltage source. The electrical connection unit according to the present disclosure can be used to ensure that a hazardous voltage source is not physically present within the container 110 when the closure 120 is in an open position. Accordingly, a risk of an operator coming into contact with the hazardous voltage source is eliminated.

The port 112 may be provided with a casing 114 configured to inhibit exposure of an electrical contact therein. The port 112 and casing 114 may be configured to provide a degree of protection against intrusion by a foreign object and/or water. The port 112 and casing 114 may be configured to provide a degree of protection in accordance with at least IEC standard 60529 (EN 60529) IP11B, but preferably in accordance with IP22B and in particular in accordance with IP43B.

Similarly, the external connector 190 may be configured (for example it may be structured and/or shaped) to inhibit exposure of an electrical contact therein. The external connector 190 may provide a degree of protection against intrusion by a foreign object and/or water. The external connector 190 may provide a degree of protection in accordance with at least IEC standard 60529 (EN 60529) IP11B, but preferably in accordance with IP22B and in particular in accordance with IP43B. Additionally, the external connector 190 may be configured (e.g. structured and/or shaped) to contain an electrical arc-flash and/or an electrical arc-blast originating from an electrical contact therein.

Figure 5A:
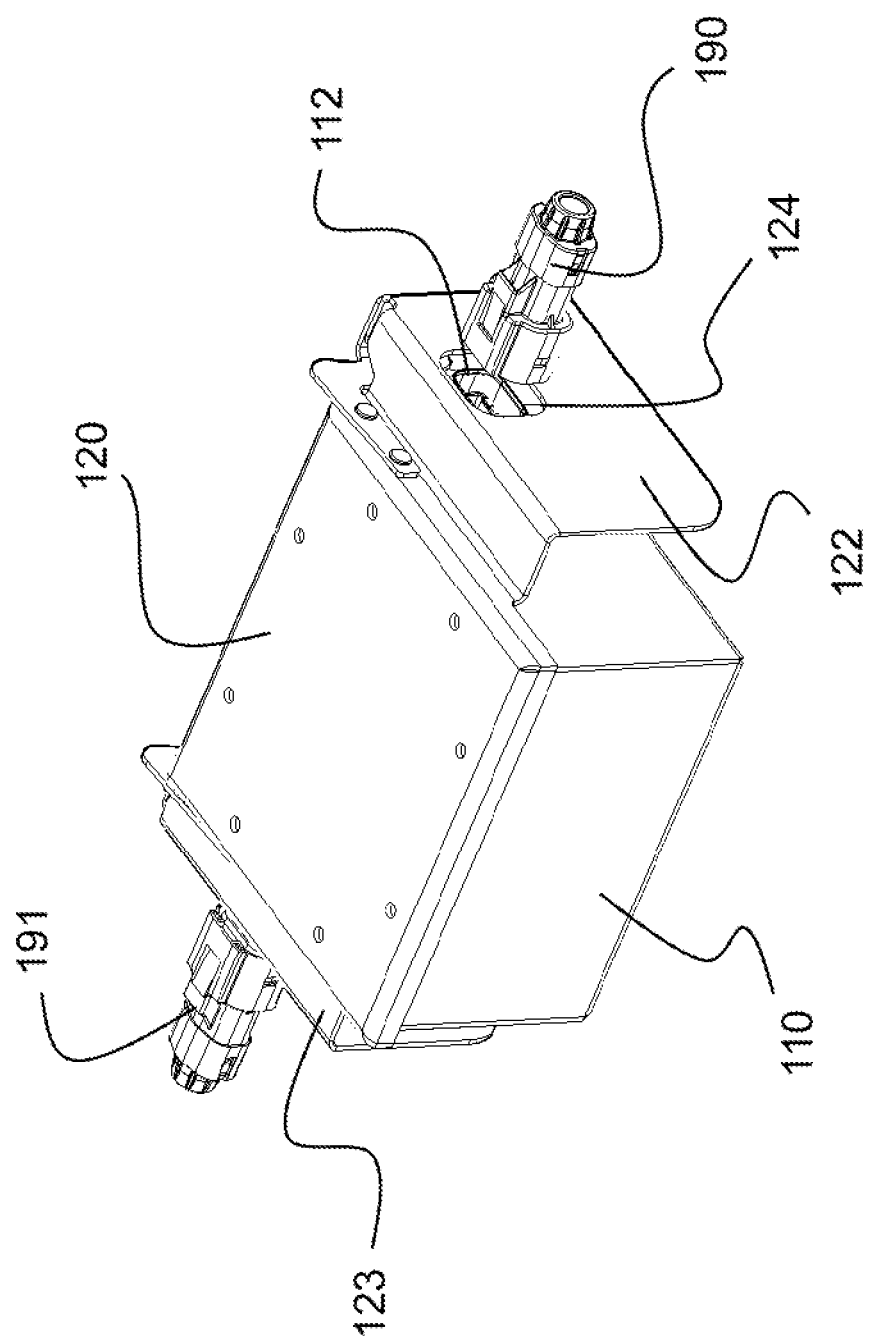
FIG. 5A-5C show perspective views of a second example electrical connection unit.
Figure 5B:
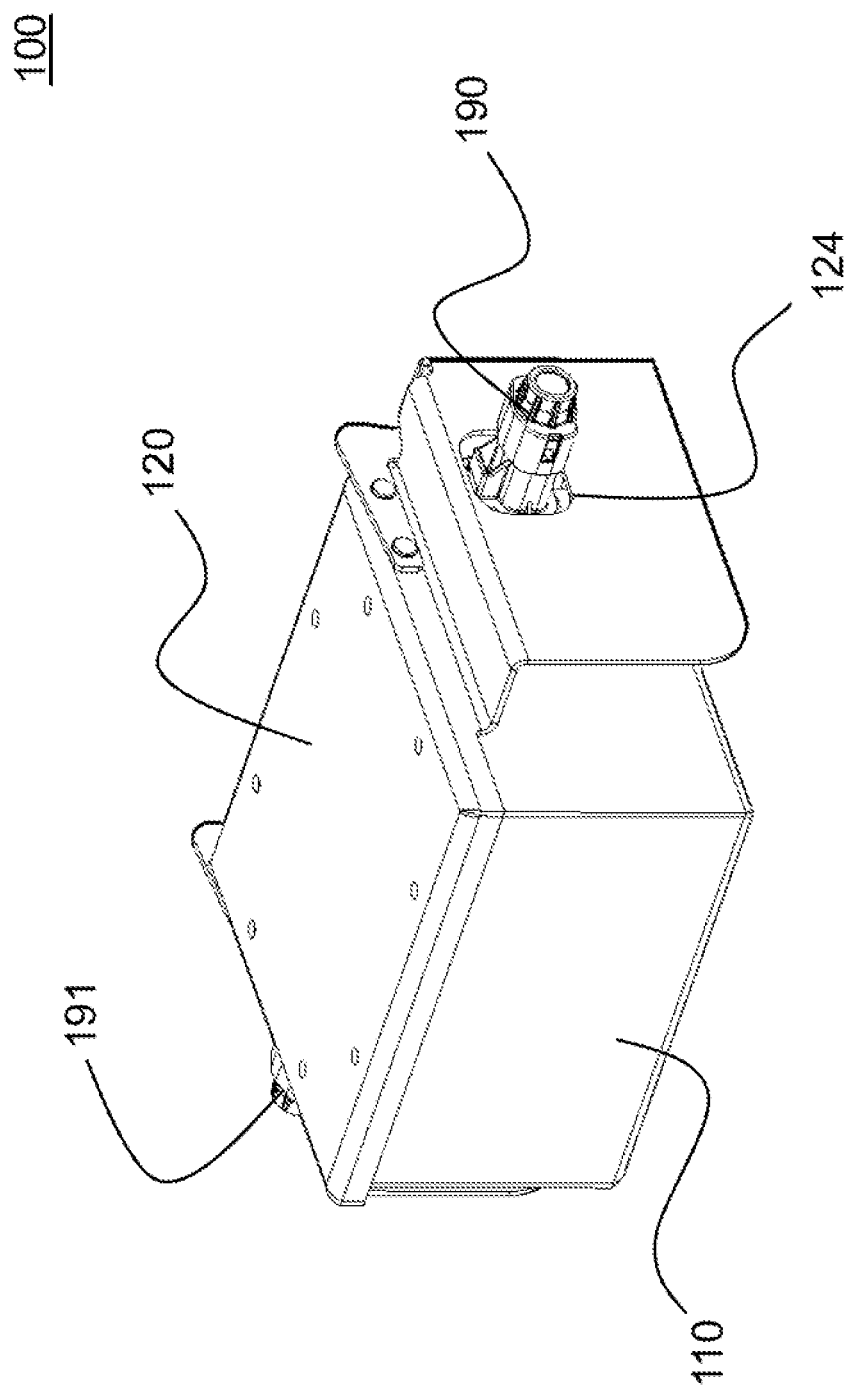
Figure 5C:
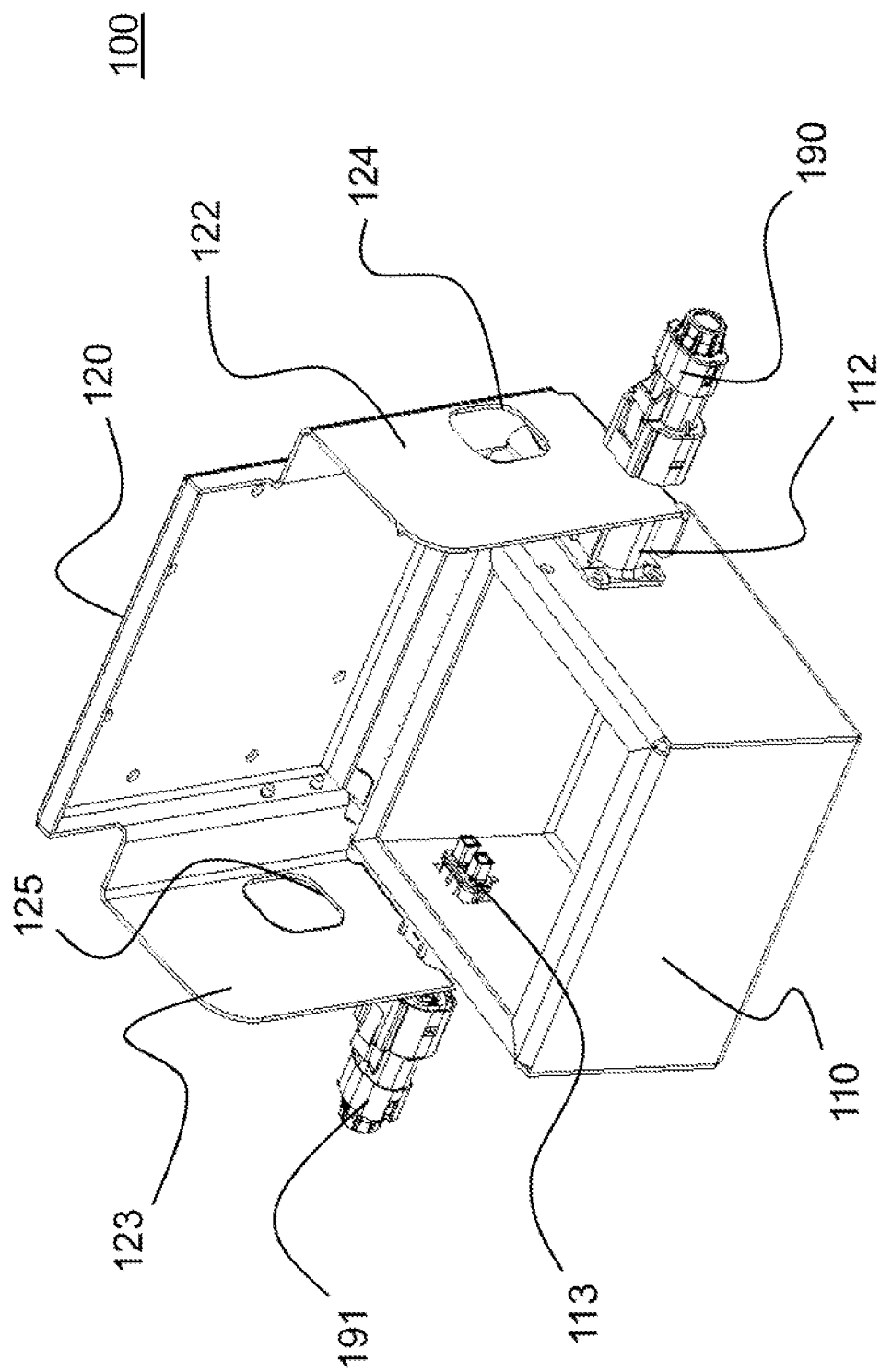

FIGS. 5A, 5B and 5C each show a second example electrical connection unit 100', a first external connector 190 and a second external connector 191, wherein the electrical connection unit 100 comprises a container 110 and a closure 120. The container 110 is provided with a first external port 112 configured to couple with the first external connector 190 and a second external portion 113 configured to couple with the second external connector 191.

The container 110, the closure 120, each port and each associated locking portion may have any of the features described above with respect to the first example electrical connection unit 100. The closure 120 of the electrical connection unit 100 may only be moved from the closed position to an open position when both external connectors are not coupled to respective external ports.

As shown in the example of FIGS. 5A, 5B and 5C, the first locking portion 122 and the second locking portion 123 may be disposed on opposing sides of the container 110. This enables the electrical unit 100 to be more resistant to a prying action applied to the closure 120 by an operator when in the closed position.

Figure 6A:
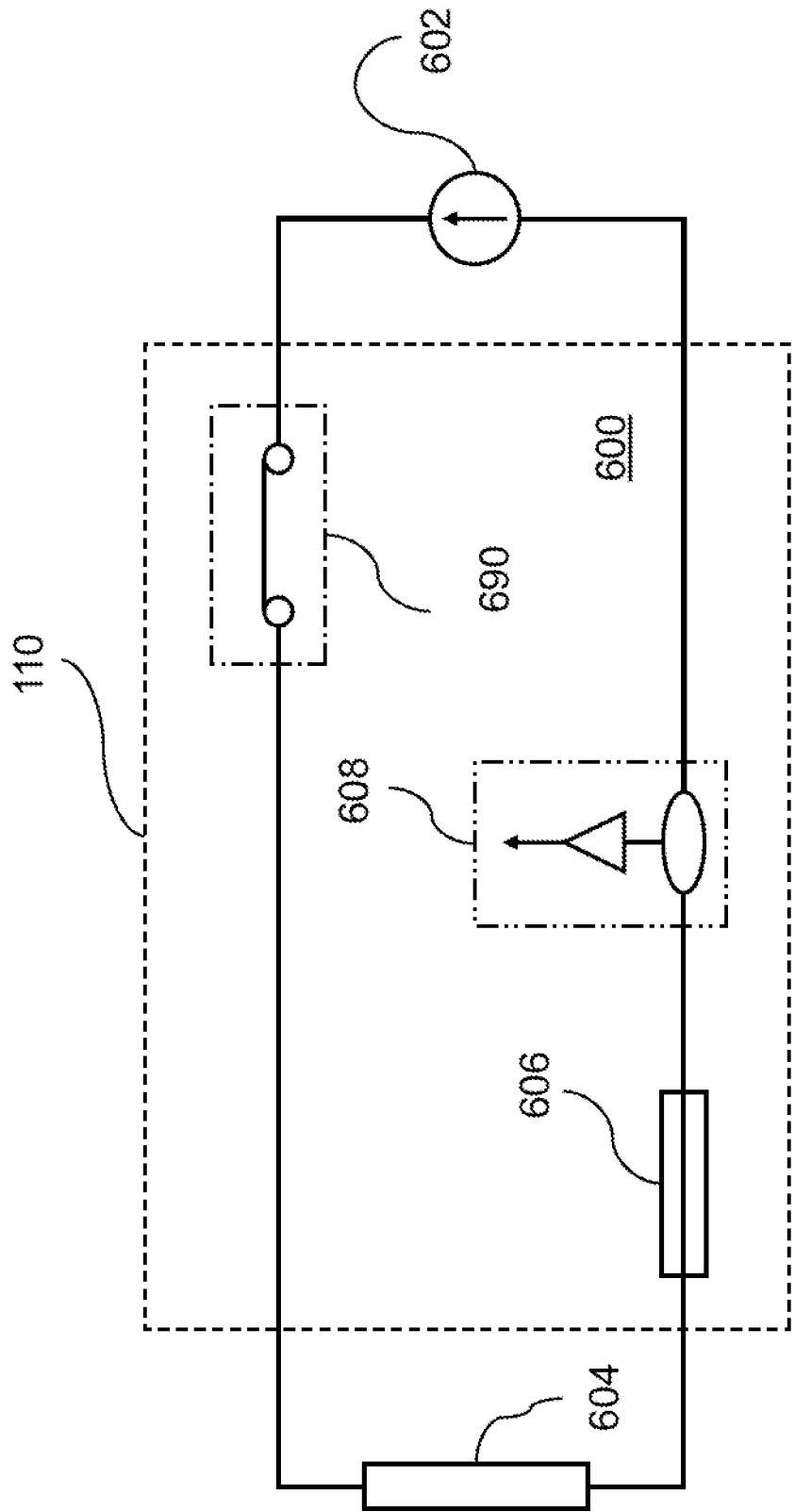
FIG. 6A-6B show an example hazardous voltage circuit in an energised state and a de-energised state.
Figure 6B:
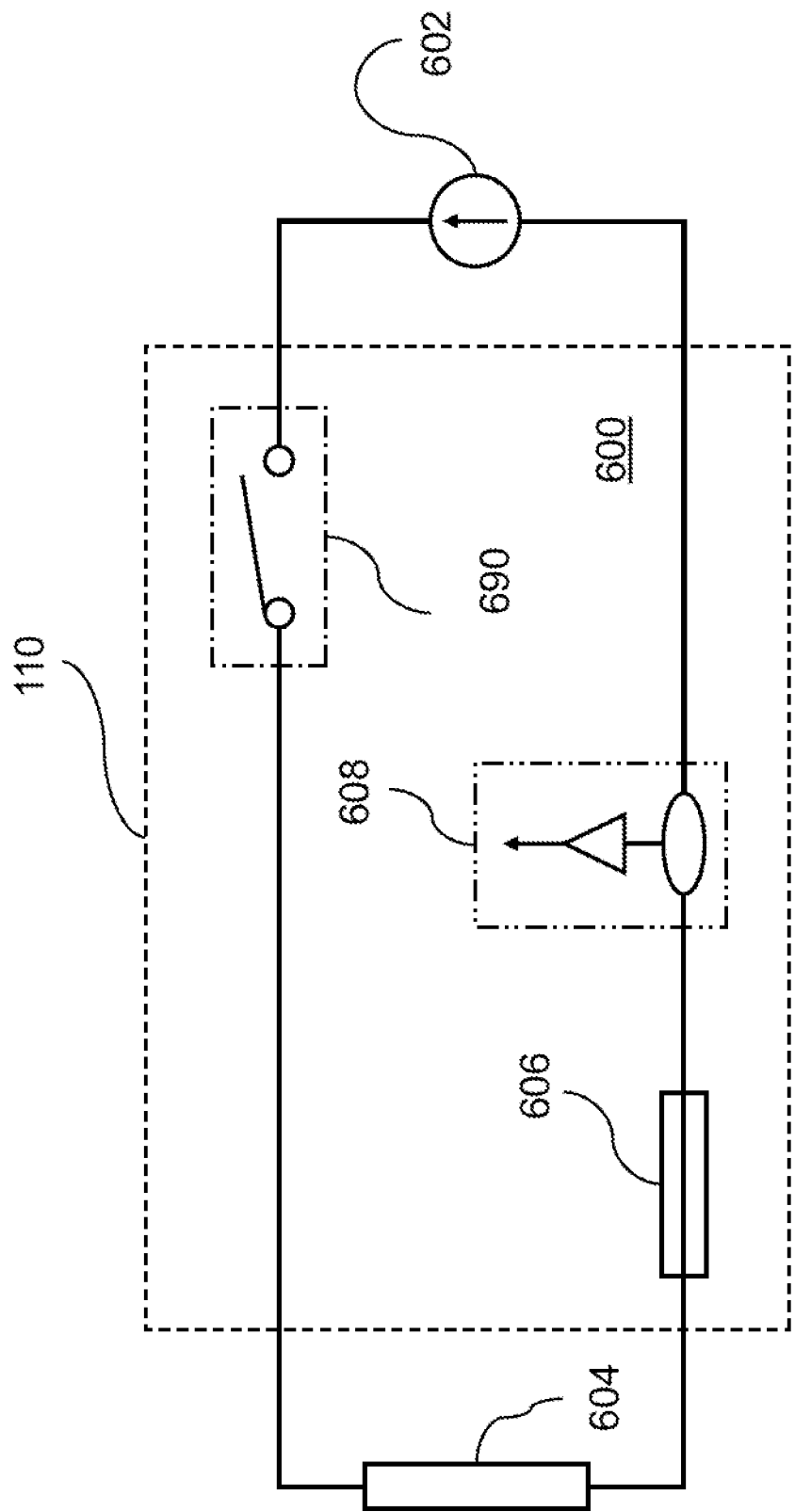

FIG. 6A shows an example hazardous voltage circuit 600 in an energised state, while FIG. 6B shows the same example hazardous voltage circuit 600 in a de-energised state. The hazardous voltage circuit 600 may form at least part of the electrical circuitry disposed within the interior of the container 110 of the electrical connection unit 100, 100' as described above with respect to FIGS. 1-5, although it will be appreciated by those of ordinary skill in the art that the electrical circuitry disposed within the interior of the container 110 may include many different components or elements. Thus it is to be understood that the example hazardous voltage circuit 600 of FIGS. 6A and 6B is shown and described herein for the purpose of explanation of a safety feature of the electrical connection unit 100.

In the following disclosure the hazardous voltage circuit 600 will be described by reference to the first example electrical connection unit 100 of FIGS. 1-5.

The hazardous voltage circuit 600 illustrated in FIGS. 6A and 6B includes a hazardous voltage source 602, which may be, for example, a source of shore power such as a mains electrical outlet, and an electrical load 604, which may be, for example, one or more components (e.g. a compressor, pump or the like) of a transport refrigeration unit. The hazardous voltage source 602 thus supplies electrical power to the load 604.

A hazardous voltage is an electrical voltage which poses a significant risk to human health if a human operator comes into proximity of or into contact with electrical circuitry through which the hazardous voltage is being conducted. The significant risk to human health posed by the hazardous voltage may stem from a risk of electric shock or electrocution, and/or from an electrical arc-flash and/or an electrical arc-blast. A hazardous voltage may be defined as an electrical voltage equal to or greater than 60 V direct current (DC), and/or equal to or greater than 30 V root mean square (rms) alternating current (AC). A hazardous voltage may also be defined as a voltage classified as a class B voltage or a higher class voltage in accordance with ISO 6469-3.

The hazardous voltage circuit 600 in the illustrated example also comprises a fuse 606 and/or a residual current device 608 (also commonly referred to as a ground fault circuit interrupter device, an appliance leakage current interrupter device or a leakage current detection interrupter device). The fuse 606 is configured to break, thereby breaking or interrupting the current path between the source 602 and the load 604 to place the hazardous voltage circuit 600 in the de-energised state, when an electrical current passed therethrough exceeds a threshold current. The residual current device 608 is configured to break or interrupt the current path between the source 602 and the load 604 so as to place the hazardous voltage circuit 600 in the de-energised state when a leakage current is detected which exceeds a leakage current threshold. The hazardous voltage circuit 600 may comprise a plurality of fuses, residual current devices and/or routing devices to control a delivery of electrical power to an electrical load or a plurality of electrical loads.

The hazardous voltage circuit 600 can be enabled by connection of an external connector 190 to an external port 112 of the electrical connection unit 100 and disabled by disconnection of the external connector 190 from the external port 112. The external port may be provided with a sensing arrangement configured to energise the hazardous voltage circuit when the external connector is coupled to the external port. In one example, the external connector 190 has a physical feature (e.g. a protrusion) which engages with a complementary physical feature of the external port 112 (e.g. a lever or other mechanical engagement formation) when the external connector 190 is coupled to the external port 112 to close a mechanical switch (e.g. a push-to-close switch) of the hazardous voltage circuit 600, so as to enable current to flow in the hazardous voltage circuit 600, thereby energising the hazardous voltage circuit 600. In another example, the external port 112 is provided with a proximity sensor and/or a contact sensor configured to close a switch (for example an electrical switch, an electronic switch or a mechanical switch) of the hazardous voltage circuit 600 when the external connector 190 is coupled to the external port 112, so as to enable current to flow in the hazardous voltage circuit 600, thereby energising the hazardous voltage circuit 600.

Alternatively, the external connector 190 may carry an electrical control signal which is provided to a hazardous voltage interlock loop. The electrical control signal may be a non-hazardous voltage. The external connector 190 may also carry a non-hazardous voltage which is provided to a non-hazardous voltage circuit. The hazardous voltage interlock loop is configured to enable current flow in the hazardous voltage circuit 600, e.g. by switching on an electrical or electronic switch such as a transistor, relay, thyristor or the like of the hazardous voltage circuit 600 when the electrical control signal is provided thereto. Thus, when the external connector 190 is connected to the external port 112, the hazardous voltage circuit 600 is energised such that current can flow in it, and when the external connector is disconnected from the external port the hazardous voltage circuit is de-energised such that current does not flow.

The hazardous voltage interlock loop may also be provided with a hazardous voltage interlock loop monitor. The hazardous voltage interloop loop monitor may be configured to compare a current supplied to the hazardous voltage interlock loop to a current received from the hazardous voltage interlock loop via an external connector 190. The hazardous voltage interlock loop monitor is configured to de-energise the hazardous voltage circuit 600 responsive to a difference between the respective currents exceeding a threshold value.

After current is prevented from flowing in the hazardous voltage circuit during de-energisation, stored electrical charge may remain in any elements of the hazardous voltage circuit which are capacitive. The hazardous voltage interlock loop may further comprise a discharge circuit configured to fully discharge stored electrical charge remaining in the hazardous voltage circuit when the hazardous voltage circuit is de-energised. The discharge circuit may be an active discharge circuit or a passive discharge circuit.

The external connector may be a hazardous voltage connector that carries hazardous voltage electrical power, or it may be a non-hazardous voltage connector that carries non-hazardous voltage control signals and/or non-hazardous voltage electrical power. The hazardous voltage interlock loop may form part of a non-hazardous voltage circuit which provides a non-hazardous voltage from a non-hazardous voltage source to a non-hazardous voltage load.

If the external connector carries hazardous voltage electrical power, the external connector 190 and the external port 112 may be configured to ensure that, during a process in which the connector is decoupled from the port, the hazardous voltage interlock loop is deprived of an electrical control signal by a physical disconnection of respective electrical contacts before the hazardous voltage circuit 600 is deprived of a hazardous voltage by a physical disconnection of respective electrical contacts. Accordingly, the hazardous voltage interlock loop ensures that the hazardous voltage circuit 600 is in the de-energised state before the hazardous voltage circuit is deprived of a hazardous voltage by a physical disconnection of respective electrical contacts. This reduces a risk of electrical arc-flash and/or electrical arc-blast between electrical contacts during the process in which the connector is decoupled from the port.

The mechanical or electrical/electronic switch that is actuated or controlled according to the connection status of the external connector and the external port is represented in FIG. 6A by switch 690. When an external connector is coupled to the external port, the connection switch 690 is in a closed state (shown in FIG. 6A) and the hazardous voltage circuit 600 is in an energised state, as a current path from the source 602 to the load 604 via the closed switch 690 exists.

Additionally or alternatively, it may be that the hazardous voltage interlock loop is configured to energise or de-energise the hazardous voltage circuit 600 by sending a signal to the hazardous voltage source 602 to connect to or to isolate from the electrical connection unit 100' depending on a connection status of an external connector. In this case, a connection status of the hazardous voltage source 602 is represented by the switch 690. As above, when an external connector is coupled to the external port, the connection switch 690 is in a closed state (shown in FIG. 6A) and the hazardous voltage circuit 600 is in an energised state, as a current path from the source 602 to the load 604 via the closed switch 690 exists.

When an external connector is not coupled to the external port, the connection switch 690 is in an open state (shown in FIG. 6B) so that the hazardous voltage circuit 600 is in a de-energised state, as there is no current path from the source 602 to the load 604.

FIG. 7A shows a method of coupling a connector to a port of an electrical connection unit 100 according to any of the previously described examples. The method comprises optionally moving the closure 120 of the container 110 to the closed position if not already in the closed position at 701. An external connector 190 is then coupled to the external port 112 of the container 110 through the connector opening 124 of the locking portion 122 of the closure 120 at 702 while the closure 120 is in the closed position.

Figure 7B:
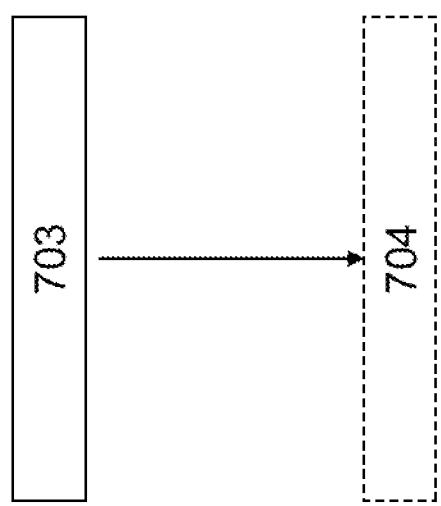
FIG. 7B is a flow diagram of a method of decoupling a connector from a port of an electrical connection unit.

FIG. 7B shows a method of decoupling a connector from a port of an electrical connection unit. The method comprises decoupling an external connector 190 from the external port 112 of the container 110 through the connector opening 124 of the locking portion 122 of the closure 120 at 703. Optionally, the closure 120 may then be moved from the closed position to an open position at 704.

The invention claimed is:

1. An electrical connection unit for a refrigeration system comprising:
a container defining an interior for containing electrical circuitry, the container having an external port configured to couple with an external connector;
a closure moveable relative to the container between a closed configuration in which access to the interior is prevented, and an open configuration in which access to the interior is permitted,
wherein the closure has a locking portion defining a connector opening for receiving the connector;
wherein the container and the closure are configured so that, when the closure is in the closed configuration, the connector opening is aligned with the port to permit coupling of the connector to the port through the connector opening to interlock with the closure;
whereby movement of the closure to the open configuration is prevented by interlocking engagement of the connector and the closure;
wherein the container and the closure cooperate to define a limited travel of the closure relative to the container for moving between the closed configuration and the open configuration of the closure; and
wherein the closure and container are configured so that the locking portion of the closure at least partly covers the port throughout the travel except for the closed configuration, to prevent the connector being coupled with the port with the closure in the open configuration.

2. The electrical connection unit according to claim 1, wherein the closure is connected to the container by a hinge.

3. The electrical connection unit according to claim 1, wherein the locking portion is configured to overlap a side of the container when in the closed configuration; and/or wherein the locking portion depends from a lid portion of the closure in the form of a flange.

4. The electrical connection unit according to claim 1, wherein the port is provided with a casing configured to inhibit exposure of an electrical contact therein.

5. The electrical connection unit according to claim 1, wherein the container contains a hazardous voltage interlock loop electrically connected to the port and configured to selectively energise or de-energise a hazardous voltage circuit.

6. The electrical connection unit according to claim 5, wherein the hazardous voltage interlock loop forms part of a non-hazardous voltage circuit.

7. The electrical connection unit according to claim 1, wherein the port is provided with a sensing arrangement configured to de-energise a hazardous voltage circuit when an external connector is not coupled to the port.

8. The electrical connection unit according to claim 1, comprising two external ports each configured to couple with a respective external connector, wherein for each port:
there is a respective locking portion of the closure defining a connector opening for receiving the respective connector;
the container and the closure are configured so that, when the closure is in the closed position, the respective connector opening is aligned with the port to permit coupling of the respective connector to the port through the connector opening to interlock with the closure;

whereby movement of the closure to the open configuration is prevented by interlocking engagement of the connector and the closure.

9. The electrical connection unit according to claim 8, wherein the locking portions are disposed on opposing sides of the container.

10. The electrical connection unit according to claim 1 and the connector configured to be coupled to the external port.

11. The electrical connection unit and connector according to claim 10, wherein the connector and the respective connector opening have corresponding cross-sectional profiles.

12. An electrical connection unit for a refrigeration system comprising:
- a container defining an interior for containing electrical circuitry, the container having an external port configured to couple with an external connector;
- a closure moveable relative to the container between a closed configuration in which access to the interior is prevented, and an open configuration in which access to the interior is permitted,
- wherein the closure has a locking portion defining a connector opening for receiving the connector;
- wherein the container and the closure are configured so that, when the closure is in the closed configuration, the connector opening is aligned with the port to permit coupling of the connector to the port through the connector opening to interlock with the closure;
- whereby movement of the closure to the open configuration is prevented by interlocking engagement of the connector and the closure;
- wherein the container contains a hazardous voltage interlock loop electrically connected to the port and configured to selectively energise or de-energise a hazardous voltage circuit.

13. The electrical connection unit according to claim 12, wherein the hazardous voltage interlock loop forms part of a non-hazardous voltage circuit.

14. An electrical connection unit for a refrigeration system comprising:
- a container defining an interior for containing electrical circuitry, the container having an external port configured to couple with an external connector;
- a closure moveable relative to the container between a closed configuration in which access to the interior is prevented, and an open configuration in which access to the interior is permitted,
- wherein the closure has a locking portion defining a connector opening for receiving the connector;
- wherein the container and the closure are configured so that, when the closure is in the closed configuration, the connector opening is aligned with the port to permit coupling of the connector to the port through the connector opening to interlock with the closure;

whereby movement of the closure to the open configuration is prevented by interlocking engagement of the connector and the closure,
- wherein the container contains a hazardous voltage interlock loop electrically connected to the port and configured to selectively energise or de-energise a hazardous voltage circuit.

* * * * *